(No Model.) 2 Sheets—Sheet 1.
J. F. WOLFF.
MACHINE FOR MANUFACTURING LEAD PIPES.
No. 559,880. Patented May 12, 1896.
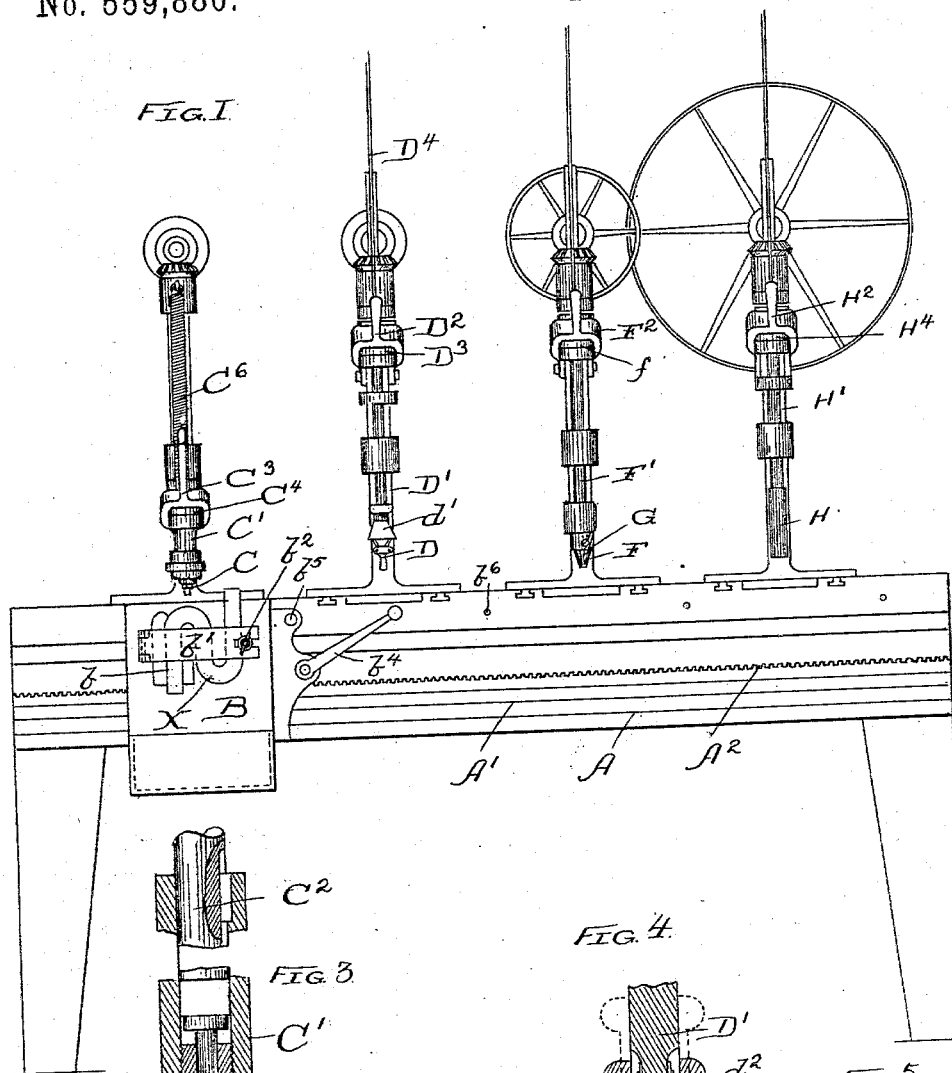
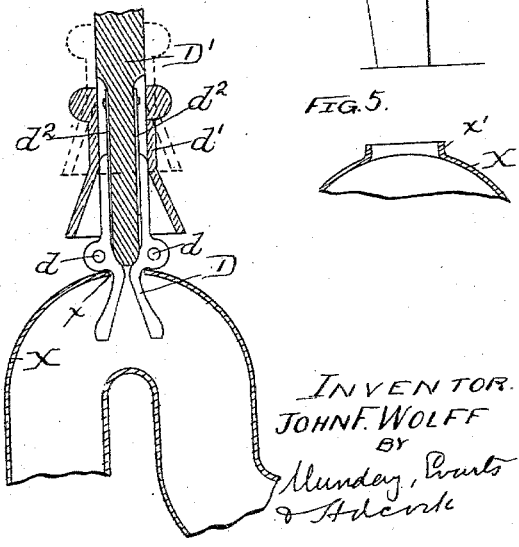
WITNESSES:
Geo. E. Curtis
H. W. Munday
INVENTOR
JOHN F. WOLFF
BY
Munday, Evarts
& Adcock
HIS ATTORNEYS.

(No Model.) 2 Sheets—Sheet 2.
J. F. WOLFF.
MACHINE FOR MANUFACTURING LEAD PIPES.
No. 559,880. Patented May 12, 1896.
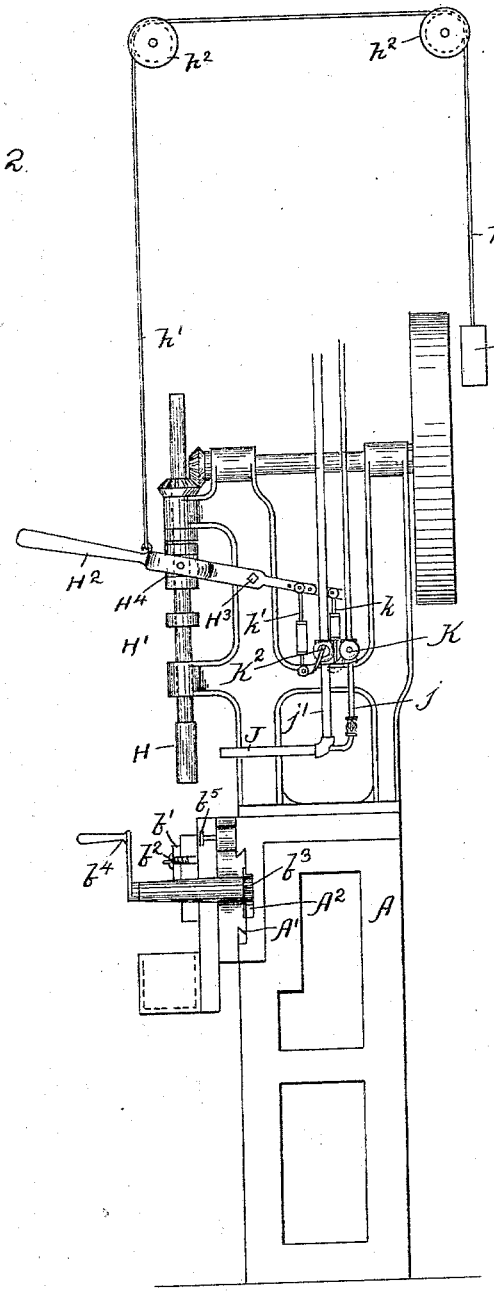
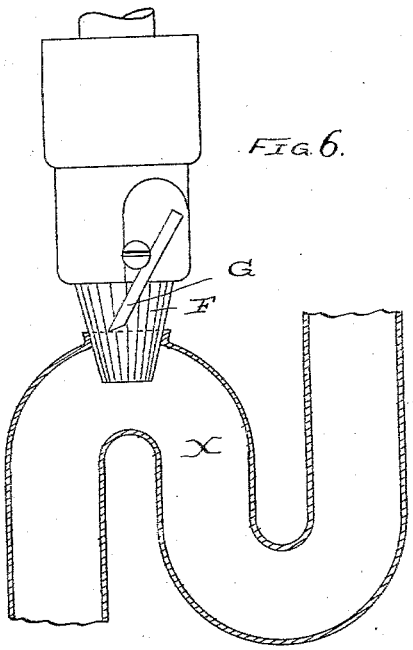
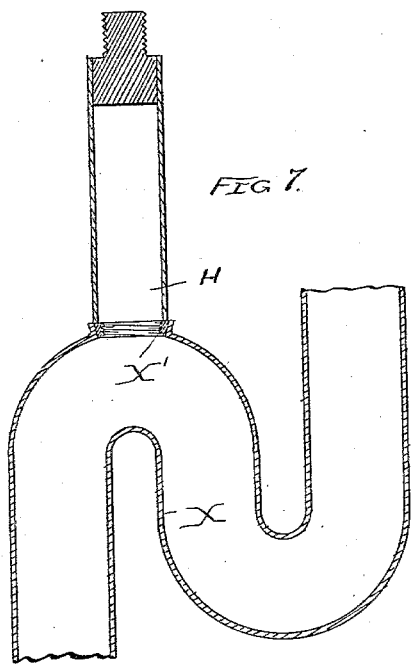
WITNESSES:
Sew. E. Curtis
H. W. Munday
INVENTOR:
JOHN F. WOLFF
By Munday, Evarts & Adcock
HIS ATTORNEYS

UNITED STATES PATENT OFFICE.

JOHN F. WOLFF, OF CHICAGO, ILLINOIS, ASSIGNOR TO THE L. WOLFF MANUFACTURING COMPANY, OF SAME PLACE.

MACHINE FOR MANUFACTURING LEAD PIPES.

SPECIFICATION forming part of Letters Patent No. 559,880, dated May 12, 1896.

Application filed August 10, 1894. Serial No. 519,968. (No model.)

*To all whom it may concern:*

Be it known that I, JOHN F. WOLFF, a citizen of the United States, residing in Chicago, in the county of Cook and State of Illinois, have invented a new and useful Improvement in Machines or Apparatus for Manufacturing Lead Traps, of which the following is a specification.

My invention relates to mechanism for manufacturing lead traps, and more particularly to mechanism for providing drawn lead traps with trap screw-rings.

The machine or mechanism forming the subject of the invention set forth in this application is one specially designed by me for manufacturing the lead trap set forth in my companion application filed of even date herewith and for carrying out the process described in said companion application.

In the accompanying drawings, which form a part of this specification and in which similar letters of reference indicate like parts throughout all the figures, Figure 1 is a side elevation of a machine embodying my invention. Fig. 2 is an end view. Fig. 3 is an enlarged detail vertical longitudinal section, partly in elevation, showing the tool for boring or cutting the small hole in the trap. Fig. 4 is a similar detail sectional view illustrating the tool for drawing from inward outward the walls surrounding the hole previously formed in the trap into an exteriorly-projecting integral cylindrical flange. Fig. 5 is a detail sectional view showing the trap after being operated upon by the tool illustrated in Fig. 4. Fig. 6 is an enlarged detail elevation, showing the trap in section, of the tool for reaming out, truing up, or shaping the exteriorly-projecting flange to conform to the exterior surface of the trap screw-ring, and also showing the tool for trimming off or squaring the outer edge of the flange. Fig. 7 is an enlarged detail vertical sectional view of the soldering-tool.

In the drawings, A represents the frame of the machine.

B is a movable holder for holding or supporting the trap X firmly and truly in position in respect to each of the operating devices or tools and by which the trap is moved or carried from one operating device to another to enable the successive operations to be performed by each in turn. The trap-holder B is furnished with a socket $b$ to receive the trap, and a hinge-clamp $b'$ to secure it firmly in place, the hinge-clamp $b'$ being provided with a thumb-screw $b^2$, so that the trap may be firmly clamped in position. The frame A is provided with a guide or way $A'$, upon which the holder B travels, and also with a rack $A^2$, with which engages a toothed wheel $b^3$ on the carriage or holder B, so that when the wheel $b^3$ is revolved by the crank $b^4$ the holder or carriage B may be moved back and forth along the track or way $A'$. The holder B is further provided with a registering pin or device $b^5$, which engages locking-recesses $b^6$ in the frame A or guide $A'$ to insure the proper registering of the trap-holder and the trap thereon with the several operating devices or tools.

C is a revolving boring or cutting tool for forming a small hole $x$ in the trap X at the point where the trap screw-ring $X'$ is to be inserted. This cutting or boring tool C preferably consists of a tube furnished with a serrated cutting edge $c$. It is secured to a sliding sleeve $C'$, which is splined to and adapted to move up and down on the revolving spindle $C^2$, by which rotary movement is communicated to the boring-tool. The boring-tool C is provided with a knock-out punch or rod $c'$ to punch or knock out of the hollow cutting-tool the disks cut from the trap. When the cutting-tool is raised from the trap by lifting the sliding sleeve $C'$, the punch or rod $c'$ will extract the disk from the hollow cutting-tool C. The sleeve $C'$, and with it the tool C, is moved up and down to bring the tool into engagement with the work and withdrawn therefrom by means of a lever $C^3$, pivoted to the frame at one end and having a yoke or fork pivotally connected to a swivel ring or collar $C^4$, surrounding the sleeve $C'$. After the small hole $x$ has thus been cut or bored in the trap the holder B is moved forward one position to bring the trap into registry with the interior expansible drawing-tool D, consisting of one or more, preferably four, opening and closing jaws pivoted at $d$ to a revolving spindle $D'$. The jaws D when closed or shut together, as shown in Fig. 1, are adapted to enter the hole $x$, after which the jaws are opened and held open, as shown in Fig. 4, by means of the sliding sleeve C', surrounding the spindle D', the lower end of the sleeve being made bell or cam shaped. The pivoted jaws D D are normally held closed by springs $d^2$ $d^2$, secured to the spindle D'. After the jaws are inserted in the hole $x$ and opened, as shown in Fig. 4, they serve to draw the wall of the trap surrounding the hole $x$ from inward outward as the revolving spindle D' and the jaws or tool D carried by it are withdrawn from the trap, thus forming an exteriorly-projecting cylindrical flange $x'$ on the trap X integral therewith. The operation of this revolving tool D upon the trap is indicated in Fig. 5, taken in connection with Fig. 4. The revolving spindle D' is moved up and down by a lever $D^2$, pivoted at one end to the frame and having a yoke or fork, which is pivotally connected to a collar $D^3$, surrounding the spindle D'. The sleeve $d'$ for holding open the jaws D is moved by hand. After the cylindrical flange $x'$ has thus been formed on the trap by the expansible drawing-tool D the holder B is moved forward one position and brought into registry with the conical shaping tool or reamer F, which enters the opening in the trap, as illustrated in Fig. 6, and trues up the flange $x'$ and gives its inner surface an outward bevel or conical shape. The revolving tool F corresponds accurately in size and shape to the exterior surface of the threaded ring X', which is to be secured in the trap. Secured to the same spindle F' which carries the shaping-tool F is a knife or trimming-tool G, which serves to trim off and square the outer edge of the flange $x'$, which now has a conical form. The revolving tool F and its spindle F' are moved up and down, as required, by means of a lever $F^2$, pivoted at one end to the frame and having a yoke or fork, which is pivotally connected to a collar $f$, surrounding the spindle F'. After the exteriorly-projecting flange $x'$ has been shaped and trimmed to correspond to and fit the ring X' the holder B is moved forward one position and brought into registry with the soldering-tool H, the same consisting, preferably, of a revolving cylindrical tube having a square lower end adapted to be brought down upon the ring X' or upon the joint between said ring and the flange $x'$, so that the first operation of the soldering-tool will be to level or square up the ring X' and then solder the same in place. The soldering-tool H or its spindle H' is moved up and down to bring it into contact with the work and withdraw it therefrom by means of a lever $H^2$, pivoted at $H^3$ to the frame of the machine and having a fork or yoke pivoted to a collar $H^4$ on the spindle H' of the soldering-tool H. A weight $h$, connected to the lever $H^2$ by a cord $h'$, which passes over pulley $h^2$, serves to hold the soldering-tool normally in its raised position.

J is a blowpipe or heater for heating the soldering-tool H when the latter is in its retracted position, as illustrated in Fig. 2. This heater or blowpipe J is connected with a gas-supply pipe $j$ and an air-blast pipe $j'$. The gas-supply pipe $j$ is furnished with a valve K, which is connected by an adjustable link $k$ to the operating-lever $H^2$, and the air-blast pipe $j'$ is furnished with a valve $K^2$, which is connected by an adjustable link $k'$ with said operating-lever $H^2$. The purpose of connecting these valves with the operating-lever is to shut off the heat or flame while the tool H is lowered and in operation, and thus prevent the upper end of the tool H or the lower end of the spindle H' being heated unnecessarily and also to prevent the flame interfering with the operator or workman at the time he is soldering the ring X' in place. The adjustable links or connections $k$ $k'$ should be set or adjusted so as to shut off the air supply entirely and nearly, but not quite, shut off the gas supply when the tool H is lowered into position for operation, so that the gas flame will not be entirely extinguished. The moment the soldering operation is completed and the lever $H^2$ released the weight $h$ withdraws the lever and thus turns on the air and gas supplies again, thus heating the soldering-tool ready for the next operation. After the ring X' is thus soldered in place in the seat formed by the flange $x'$ the holder B is then returned to its original position into registry with the spindle $C^2$, carrying the boring-tool C, at which position the final or finishing step or operation is performed by the trimming-tool L, which cuts or squares off the upper or outer edge of the ring X' and the flange $x'$. As the holder B is to be returned to its original position for operation upon the next trap by the boring-tool C, I prefer to mount the finishing-tool L on the same spindle which carries the boring-tool C. The finishing-tool L preferably consists of a tubular or cylindrical cutter having a serrated lower cutting edge $l$. This cutter L is preferably secured by a set-screw $l'$ to the tool C.

$l^2$ is a centering device for the finishing-tool L, the same being secured to the tool C and adapted to enter the interior of the ring X'. To turn off or finish the outer bur that may be formed on the flange $x'$, I secure to the finishing-tool L a downwardly-projecting knife $l^3$ by a set-screw $l^4$ and band $l^5$.

The lever $C^3$ is held normally retracted by a spring $C^6$. The lever $D^2$ is held normally in its retracted position by a weight connected to said lever by a cord $D^4$, arranged similarly to the weight $h$ and cord $h'$, and in like manner the lever $F^2$ is held normally retracted by a cord and weight.

I claim—

1. In a machine for securing trap screw-rings in lead traps, the combination with a movable trap-holder, of a revolving tool for boring or cutting a small hole in the trap, a revolving expansible tool adapted to be inserted in said hole and expanded for drawing the wall surrounding the hole from inward outward, and thus forming an exteriorly-projecting flange on the trap, a revolving tool or reamer for shaping the interior of said flange to conform to the exterior of the trap screw-ring, a revolving tool for trimming or squaring the upper edge of said flange, a revolving soldering-tool for soldering said ring within said flange, and a revolving finishing-tool for smoothing the outer edge of said ring and flange, substantially as specified.

2. The combination with a trap-holder, of a tool for forming a hole in the trap, and an expansible revolving drawing-tool adapted to be inserted in the hole and expanded for drawing the wall surrounding the hole into an exteriorly-projecting flange, substantially as specified.

3. The combination with a trap-holder of a boring-tool, a revolving expansible drawing-tool, a revolving shaping or reaming tool, and a soldering-tool, substantially as specified.

4. The combination with a trap-holder of a revolving and sliding soldering-tool, a burner or heater connected with a gas-supply pipe and an air-supply pipe, the valves for opening and closing said gas and air supply pipes, and means connecting said valves with said sliding soldering-tool, so that said valves may be opened and closed in whole or in part by the movement of the sliding tool, substantially as specified.

5. The combination with a trap-holder of a sliding and revolving soldering-tool, a burner for heating the same, a valve or device for controlling the burner, and mechanism connecting said burner-controlling device with the soldering-tool, substantially as specified.

6. The combination with a revolving and sliding soldering-tool, of a burner for heating the tool, a device for controlling the burner, and mechanism connecting the burner-controlling device with the soldering-tool, substantially as specified.

7. In a machine for securing trap screw-rings in lead traps, the combination with a movable trap-holder and a track or way for the holder, of a revolving tool for boring or cutting a small hole in the trap, a revolving expansible tool adapted to be inserted in said hole and expanded for drawing the wall surrounding the hole from inward outward, and thus forming an exteriorly-projecting flange on the trap, a revolving shaping tool or reamer for shaping the interior of said flange to conform to the exterior of the trap screw-ring, a revolving tool for trimming or squaring the upper edge of the flange, a revolving soldering-tool for soldering said ring within the flange, and a revolving finishing-tool for smoothing the outer edge of said ring and flange, substantially as specified.

8. The combination with a trap-holder and a track or way for the holder, of a tool for forming a hole in the trap, and an expansible revolving drawing-tool adapted to be inserted in the hole and expanded for drawing the wall surrounding the hole into an exteriorly-projecting flange, substantially as specified.

9. The combination with a trap-holder and a track or way for the holder, of a boring-tool, a revolving expansible drawing-tool, a revolving shaping or reaming tool, and a soldering-tool, substantially as specified.

10. The combination with a trap-holder of a revolving expansible drawing-tool adapted to be inserted in a hole in the trap and expanded for drawing the wall surrounding the hole into an exteriorly-projecting flange, a track or way for the holder, means for moving said holder along said track or way, and means for registering said holder with said expansible drawing-tool, substantially as specified.

11. The combination with a trap-holder, of a revolving conical shaping or reaming tool F, and a cutting or trimming tool G secured to said reaming-tool and revolving therewith, a track or way for the holder, means for moving said holder along said track or way, and means for registering said holder with said reaming and trimming tools, substantially as specified.

12. The combination with a trap-holder of a revolving tubular boring-tool C, provided with a knock-out punch or rod $c'$, a track or way for the holder, means for moving said holder along said track or way, and means for registering said holder with said boring-tool, substantially as specified.

13. The combination with a trap-holder, of a revolving boring-tool C, a revolving finishing or cutting tool L, a common spindle for revolving both of said tools, a track or way for the holder, means for moving said holder along said track or way, and means for registering said holder with said boring and finishing tools, substantially as specified.

14. The combination with a trap-holder, of a revolving boring-tool C, finishing-tool L and knife $l^3$ all secured together and rotating on a common axis, a track or way for the holder, means for moving said holder along said track or way, and means for registering said holder with said boring and finishing tools, substantially as specified.

15. The combination with a trap-holder of a revolving and sliding soldering-tool, a burner or heater connected with a gas-supply pipe and an air-supply pipe, the valves for opening and closing said gas and air supply pipes, means for connecting said valves with said sliding soldering-tool so that said valves may be opened and closed in whole or in part by the movement of the sliding tool, a track or way for the holder, and means for moving said holder along the track or way, and means for registering said holder with said soldering-tool, substantially as specified.

16. The combination with a trap-holder, of means for forming a seat in the trap for a trap screw-ring, a sliding and revolving soldering-tool, a burner for heating the same, a valve or device for controlling the burner, mechanism connecting said burner-controlling device with the soldering-tool, a track or way for the holder, means for moving the holder, and means for registering the holder with said soldering-tool, substantially as specified.

17. The combination with a trap-holder, of means for forming a seat in the trap for a trap screw-ring, a revolving and sliding soldering-tool, a burner for heating the tool, a device for controlling the burner, and mechanism connecting the burner-controlling device with the soldering-tool, substantially as specified.

JOHN F. WOLFF.

Witnesses:
H. M. MUNDAY,
EMMA HACK.